US008734929B2

(12) United States Patent
Kim et al.

(10) Patent No.: US 8,734,929 B2
(45) Date of Patent: May 27, 2014

(54) HYDROPHOBIC COMPOSITES AND METHODS OF MAKING THE SAME

(75) Inventors: Yong Hyup Kim, Seoul (KR); Seung Min Lee, Seoul (KR)

(73) Assignee: SNU R&DB Foundation (KR)

( * ) Notice: Subject to any disclaimer, the term of this patent is extended or adjusted under 35 U.S.C. 154(b) by 908 days.

(21) Appl. No.: 12/197,754

(22) Filed: Aug. 25, 2008

(65) Prior Publication Data

US 2010/0047523 A1 Feb. 25, 2010

(51) Int. Cl.
*B32B 3/00* (2006.01)

(52) U.S. Cl.
USPC ............ 428/141; 428/142; 428/143; 428/144

(58) Field of Classification Search
USPC ........... 428/141–144, 148; 977/762, 810, 811
See application file for complete search history.

(56) References Cited

U.S. PATENT DOCUMENTS

| | | | | |
|---|---|---|---|---|
| 2004/0067339 | A1* | 4/2004 | Gandon et al. | 428/141 |
| 2005/0009953 | A1* | 1/2005 | Shea | 523/169 |
| 2005/0181195 | A1* | 8/2005 | Dubrow | 428/297.4 |
| 2007/0031639 | A1* | 2/2007 | Hsu et al. | 428/141 |

FOREIGN PATENT DOCUMENTS

| | | |
|---|---|---|
| KR | 1020040057353 | 7/2004 |
| KR | 1020050079784 | 8/2005 |
| KR | 20070044437 | 4/2007 |
| WO | WO-2006/091235 | 8/2006 |

OTHER PUBLICATIONS

Tzeng Y, T. S. Huang, Y.C. Chen, C. Liu and Y. K. Liu. "Hydration Properties of Carbon Nanotubes and Their Effects on Electrical and Biosensor Applications." New Diamond and Frontier Carbon Technology. vol. 14, No. 3. 2004.*

Office Action for Korean Appl. No. 10-2008-0121169 mailed Jan. 20, 2011 (5 pages).

English Language Translation of Office Action for Korean Appl. No. 10-2008-0121169 mailed Jan. 20, 2011 (4 pages).

Guo et al., Fabrication of superhydrophobic copper by wet chemical reaction, *Thin Solid Films*, 515:7190-7194 (2007).

Sun et al., Bioinspired surfaces with special wettability, *Acc. Chem. Res.*, 38:644-652 (2005).

Yeon et al., Filed emission characteristics of CuO nanowires grown on brown-oxide-coated Cu films on Si substrates by conductive heating in air, *J. Vac. Sci. Technol. B*, 24(2):940-944 (Mar./Apr. 2006).

* cited by examiner

*Primary Examiner* — Maria Veronica Ewald
*Assistant Examiner* — Nancy Rosenberg
(74) *Attorney, Agent, or Firm* — Foley & Lardner LLP

(57) ABSTRACT

Hydrophobic composites, as well as methods for making a hydrophobic composite, are provided. A hydrophobic composite may include a plurality of nanostructures elongated from one or more supports and having a configuration characterized by a first hydrophobicity, and at least one substance characterized by a second hydrophobicity and configured to at least partially cover one or more portions of the plurality of nanostructures such that the overall hydrophobicity of the hydrophobic composite is greater than the first hydrophobicity.

13 Claims, 4 Drawing Sheets

HYDROPHOBIC COMPOSITES AND METHODS OF MAKING THE SAME

TECHNICAL FIELD

The present disclosure generally relates to hydrophobic composites.

BACKGROUND

Recently, hydrophobic or superhydrophobic surfaces have attracted a great deal of attention in many industrial areas due to the surface properties that make them potentially useful in various applications, such as optics, automobiles, building materials, and electronics.

Surface morphology is an important factor that influences the hydrophobicity or wettability of a surface. Cassie's law is used to describe the effective contact angle of a liquid on a composite surface and explains how roughing up a surface increases the apparent surface angle. The law is stated as in Formula I:

$$\cos\theta' = f\cos\theta - (1-f)$$

where θ' represents the apparent contact angle on a rough surface, θ represents the intrinsic contact angle on a flat surface, f represents the fraction of the solid/water interface, and (1−f) represents the fraction of the air/water interface. A contact angle is the angle at which a liquid/vapor interface meets the solid surface. A contact angle of 0° denotes complete wettability and no drop formation, whereas a contact angle of 180° denotes complete unwettability. Cassie's law implies that with a small f and a large θ it is possible to create surfaces with a very large contact angle, i.e., with a reduced contact area. A composite with a rough surface has a water repelling quality, i.e., is hydrophobic.

Surface energy is another factor that affects the hydrophobicity of a surface. In general, a surface with high surface energy is likely to be hydrophilic, whereas a surface with low surface energy is likely to be hydrophobic. Thus, treatments that are capable of reducing the surface energy of a composite may increase the hydrophobicity of the composite surface.

SUMMARY

Embodiments of hydrophobic composites and methods for making such composites are disclosed herein. In accordance with one embodiment by way of non-limiting example, a hydrophobic composite includes a plurality of nanostructures elongated from one or more supports and having a configuration characterized by a first hydrophobicity, and at least one substance characterized by a second hydrophobicity and configured to at least partially cover one or more portions of the plurality of nanostructures such that an overall hydrophobicity of the hydrophobic composite is greater than the first hydrophobicity.

In another embodiment, a hydrophobic composite includes a plurality of nanostructures provided in a configuration in which each of the nanostructures is configured to extend at least partially vertically away from one or more supports in such a way that the nanostructures are characterized by a first hydrophobicity, and at least one substance which is characterized by a second hydrophobicity and configured to at least partially cover one or more portions of the plurality of nanostructures, whereby the composite is characterized by an overall hydrophobicity, at least a portion of which is attributed to the configuration of the nanostructures, at least a portion of which is attributed to the configuration of the substance and, therefore, which is greater than the first hydrophobicity.

In another embodiment, a method for making a hydrophobic composite includes forming a plurality of nanostructures elongated from one or more supports in a configuration characterized by a first hydrophobicity, and coating at least partially one or more portions of the plurality of nanostructures with at least one substance characterized by a second hydrophobicity.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
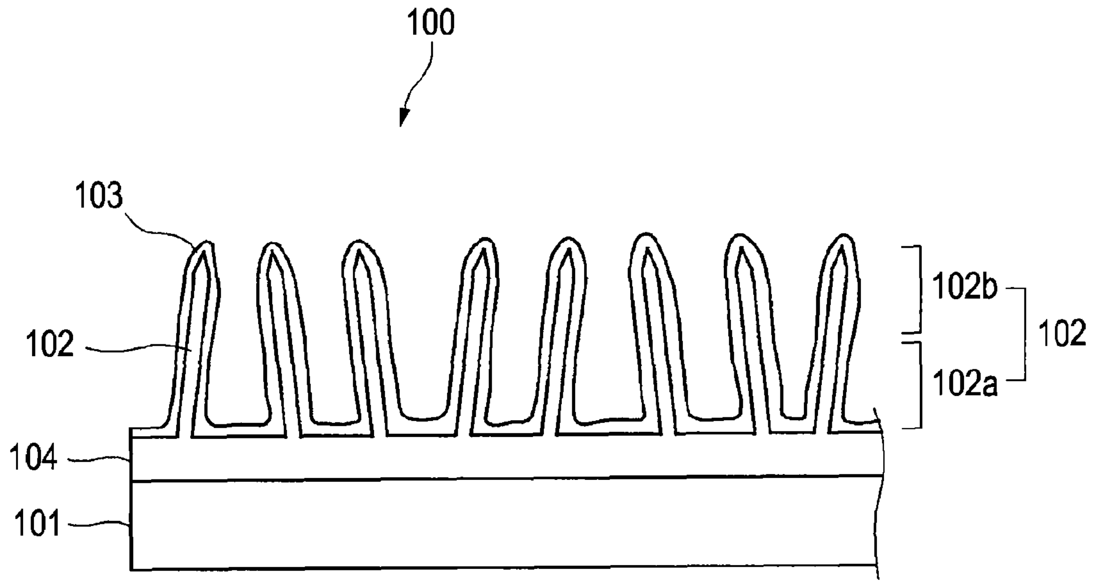
FIGS. 1A-B show an illustrative embodiment of a hydrophobic composite.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the components of the present disclosure may be arranged and designed in a wide variety of different configurations. Those of ordinary skill will appreciate that the functions performed in the methods may be implemented in differing order, and that the outlined steps are provided only as examples, and some of the steps may be optional, combined into fewer steps, or expanded to include additional steps without detracting from the essence of the present disclosure.

As used herein, a "nanostructure" refers to a structure of an intermediate size between molecular and microscopic structures, such as a nanowire. In the present disclosure, a "nanostructure" also encompasses other similar-shaped structures including, but not limited to, nanorods, nanofibers, nanopillars, nanoneedles, nanocones, and nanothorns.

Figure 1B:
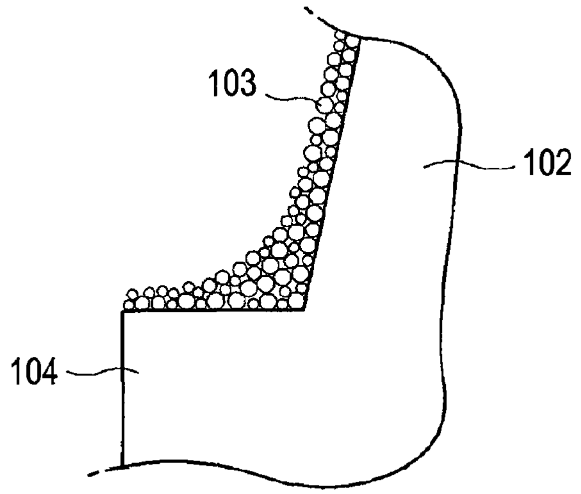

Referring to FIGS. 1A-B, an illustrative embodiment of a hydrophobic composite 100 is shown. In some embodiments, the hydrophobic composite 100 optionally includes one or more of a substrate 101, a plurality of nanostructures 102, at least one substance 103, and a support 104. As illustrated in FIG. 1A, the plurality of nanostructures 102 may be elongated from the support 104 and have a configuration characterized by a first hydrophobicity. The at least one substance 103 may be characterized by a second hydrophobicity. In some embodiments, the first hydrophobicity and the second hydrophibicity are the same. In some embodiments, the first hydrophobicity and the second hydrophibicity are different.

As illustrated in FIG. 1B, which is a magnified view of a portion of the composite 100 shown in FIG. 1A, the at least one substance 103 may be configured to at least partially cover one or more portions of the plurality of nanostructures 102 such that the overall hydrophobicity of the hydrophobic composite 100 is greater than the first hydrophobicity. In some embodiments, the overall hydrophobicity may be greater than each (and/or both) of the first and second hydrophobicities. For example, in an illustrative embodiment, where the plurality of nanostructures 102 exhibits a first hydrophobicity indicated by a contact angle of about 140° and the at least one substance 103 exhibits a second hydrophobicity indicated by a contact angle of about 110°, the overall hydrophobicity of the hydrophobic composite 100 may be indicated by a contact angle of about 170°.

In certain embodiments, the hydrophobic composite 100 includes the plurality of nanostructures 102 provided in a configuration in which each of the nanostructures 102 is configured to extend at least partially vertically away from the support 104 in such a way that the nanostructures 102 are characterized by a first hydrophobicity.

The at least one substance 103 is characterized by a second hydrophobicity and configured to at least partially cover one or more portions of the plurality of nanostructures 102. The hydrophobic composite 100 may be characterized by an overall hydrophobicity, at least a portion of which is attributed to the configuration of the nanostructures 102, and at least a portion of which is attributed to the configuration of the substance 103 resulting, therefore, in a greater overall hydrophobicity.

In some embodiments, the nanostructures 10 may be configured such that a first end 102*a* is adjacent to and covering a portion of the support 104 and a second end 102*b* is distal from the support 104. As used herein, the term "first end" refers to a portion of the nanostructure 102 that is one or more of adjacent to, in contact with, close to, or near the support 104, generally encompassing, e.g., from about 0% up to about 50% of the entire length of the nanostructure 102, as measured from the support 104 to the top of the nanostructure 102. The term "second end" refers to a portion of the nanostructure 102 that is distal or away from the support 104, generally encompassing, e.g., from about 50% up to about 100% of the entire length of the nanostructure 102, as measured from the support 104 to the top of the nanostructure 102.

In certain embodiments, the substance 103 may be configured to at least partially cover at least substantial portions of the support 104, that are not already covered by the nanostructures 102. In some embodiments, "substantial portions" of the support 104 may include from about 10% to about 100%, from about 30% to about 100%, from about 50% to about 100%, from about 70% to about 100%, from about 90% to about 100%, from about 10% to about 30%, from about 10% to about 50%, from about 10% to about 70%, from about 10% to about 90%, from about 30% to about 50%, from about 50% to about 70%, or from about 70% to about 90% of the entire area of the support 104 that is not covered by the nanostructures 102. In other embodiments, "substantial portions" of the support 104 may include about 10%, about 30%, about 50%, about 70%, about 90%, or about 100% of the entire area of the support 104 that is not covered by the nanostructures 102.

In certain embodiments, the substance 103 may be configured to at least partially cover at least substantial portions of the first end 102*a* of the nanostructures 102. In some embodiments, "substantial portions" of the first end 102*a* of the nanostructures 102 may include from about 10% to about 100%, from about 30% to about 100%, from about 50% to about 100%, from about 70% to about 100%, from about 90% to about 100%, from about 10% to about 30%, from about 10% to about 50%, from about 10% to about 70%, from about 10% to about 90%, from about 30% to about 50%, from about 50% to about 70%, or from about 70% to about 90% of the total area including the entire first end 102*a* of all of the nanostructures 102 on the composite 100. In other embodiments, "substantial portions" of the first end 102*a* of the nanostructures 102 may include about 10%, about 30%, about 50%, about 70%, about 90%, or about 100% of the total area including the entire first end 102*a* of all of the nanostructures 102 on the composite 100.

In certain embodiments, the substance 103 may be configured to at least partially cover at least substantial portions of the second end 102*b* of the nanostructures 102. In some embodiments, "substantial portions" of the second end 102*b* of the nanostructures 102 may include from about 10% to about 100%, from about 30% to about 100%, from about 50% to about 100%, from about 70% to about 100%, from about 90% to about 100%, from about 10% to about 30%, from about 10% to about 50%, from about 10% to about 70%, from about 10% to about 90%, from about 30% to about 50%, from about 50% to about 70%, or from about 70% to about 90% of the total area including the entire second end 102*b* of all of the nanostructures 102 on the composite 100. In other embodiments, "substantial portions" of the second end 102*b* of the nanostructures 102 may include about 10%, about 30%, about 50%, about 70%, about 90%, or about 100% of the total area including the entire second end 102*b* of all of the nanostructures 102 on the composite 100.

The amount of the substance 103 coating each of the different regions of the composite 100 may depend on the size, concentration, and/or properties of the substance 103, as well as the geometrical configuration of the plurality of nanostructures 102 and/or the support 104. For example, when the size of the substance 103 is smaller than the space between the plurality of nanostructures 102 and there is a relatively sufficient amount of the substance 103 that can be applied to the composite 100, the substance 103 may cover the first end 102*a* of the nanostructures 102, the second end 102*b* of the nanostructures 102, and the support 104, as illustrated in FIGS. 1A-B. In some embodiments, when the size of the substance 103 is similar to, or larger than, the space between the plurality of nanostructures 102, the substance 103 may primarily cover the second end 102*b* of the nanostructures 102, since the substance 103 may be incapable of reaching the inner regions of the composite 100, such as the support 104 and/or the first end 102*a* of the nanostructures 102. In other embodiments, the substance 103 having a low viscosity may penetrate more easily into the space between the plurality of nanostructures 102 and be coated on the support 104 and/or the first end 102*a* of the nanostructures 102, if the size of the substance 103 is similar to, or larger than, the space between the plurality of nanostructures 102. In some embodiments, the support 104 and/or the first end 102*a* of the nanostructures 102 may be almost buried (e.g. access completely blocked) by the plurality of nanostructures 102 extending randomly from the support 104 in many different directions, in which case the substance 103 may be deposited predominantly on the second end 102*b* of the nanostructures 102.

The substrate 101 may be made of a variety of materials including, but not limited to, metal, alloy, glass, ceramic, wood, concrete, plaster, and paper. In some embodiments, the substrate 101 may be packages, windows, or external surfaces of electrical equipment, catalysts, vehicles, aircrafts, home appliances, buildings, storage vessels and the like.

The support 104 may include, by way of non-limiting example, a metal, a metal oxide, or a combination thereof. In some embodiments, the metal oxide may include, without limitation, copper oxide, titanium oxide, tungsten oxide, and the like. Further, the metal oxide may be, without limitation, a copper oxide selected from the group consisting of cuprous oxide, cupric oxide, and a combination thereof.

In some embodiments, the plurality of nanostructures 102 may extend from the support 104, which is in a layer form, as illustrated in FIGS. 1A-B. The plurality of nanostructures 102 extending from the support 104 may include, by way of non-limiting example, a metal, a metal oxide, or a combination thereof. In some embodiments, the metal oxide may include, without limitation, copper oxide, titanium oxide, tungsten oxide, and the like. Further, the metal oxide may be, without limitation, a copper oxide selected from the group consisting of cuprous oxide, cupric oxide, and a combination thereof. The plurality of nanostructures 102 may be configured to extend from the support 104 randomly in a number of directions or in an orderly direction to form specific surface morphologies.

In illustrative embodiments, the plurality of nanostructures 102 may be nanowires. The nanowires may have, without limitation, an average diameter of from about 0.001 nm to about 10 μm. In some embodiments, the average diameter of the nanowires may range from about 0.01 nm to about 10 μm, from about 0.1 nm to about 10 μm, from about 1 nm to about 10 μm, from about 10 nm to about 10 μm, from about 100 nm to about 10 μm, from about 1 μm to about 10 μm, from about 0.001 nm to about 0.01 nm, from about 0.001 nm to about 0.1 nm, from about 0.001 nm to about 1 nm, from about 0.001 nm to about 10 nm, from about 0.001 nm to about 100 nm, from about 0.001 nm to about 1 μm, from about 0.01 nm to about 0.1 nm, from about 0.1 nm to about 1 nm, from about 1 nm to about 10 nm, from about 10 nm to about 100 nm, or from about 100 nm to about 1 μm. In other embodiments, the average diameter of the nanowires may be about 0.001 nm, about 0.01 nm, about 0.1 nm, about 1 nm, about 10 nm, about 20 nm, about 100 nm, about 1 μm, or about 10 μm.

Further, the nanowires may have, without limitation, an average length of from about 0.01 nm to about 100 μm. In some embodiments, the average diameter of the nanowires may range from about 0.1 nm to about 100 μm, from about 1 nm to about 100 μm, from about 10 nm to about 100 μm, from about 100 nm to about 100 μm, from about 1 μm to about 100 μm, from about 10 μm to about 100 μm, from about 0.01 nm to about 0.1 nm, from about 0.01 nm to about 1 nm, from about 0.01 nm to about 10 nm, from about 0.01 nm to about 100 nm, from about 0.01 nm to about 1 μm, from about 0.01 nm to about 10 μm, from 0.1 nm to about 1 nm, from about 1 nm to about 10 nm, from about 10 nm to about 100 nm, from about 100 nm to about 1 μm, or from about 1 μm to about 10 μm. In other embodiments, the average length of the nanowires may be about 0.01 nm, about 0.1 nm, about 1 nm, about 10 nm, about 100 nm, about 1 μm, about 4 μm, about 6 μm, about 10 μm, or about 100 μm.

The increased surface roughness caused by the plurality of nanostructures 102 of the hydrophobic composite 100 dramatically enhances the water repellency of the composite 100. Thus, when the rough surface of the composite 100 resulting from the plurality of nanostructures 102 comes into contact with water, the base area of the support 104 can trap air within the space between the plurality of nanostructures 102, greatly reducing the real contact area between the solid surface and the water droplet and leading to increased hydrophobicity.

The substance 103 may include a hydrophobic compound, such as but not limited to, alkoxysilane, polyalkylsilane, fluorinated alkylsilane, chlorinated alkylsilane, alkylalkoxysilane, arylsilane, polyalkylsiloxane, vinyl terminated polyalkylsiloxane, perfluoroalkylsilane, polypropylene, polybutadiene, and any combination thereof. In some embodiments, the substance 103 may include a vinyl terminated polyalkylsiloxane, such as but not limited to, vinyl terminated polydimethylsiloxane, tetramethyldivinyldisiloxane, methylphenylvinyl-terminated polydimethylsiloxane, methyldivinyl-terminated polydimethylsiloxane, vinyl-terminated polymethylphenetylsiloxane, cyclic vinylmethylsiloxane, and any combination thereof. In other embodiments, the substance 103 may include carbon nanotubes.

The substance 103 may chemically modify the rough surface of the composite 100 having the plurality of nanostructures 102 to reduce the surface energy, thereby further enhancing the water repelling quality of the composite surface. Therefore, the overall hydrophobicity of the composite 100 may be partly attributed to the roughened surface morphology by the plurality of nanostructures 102 and partly attributed to the chemical modification by the substance 103.

Figure 2:
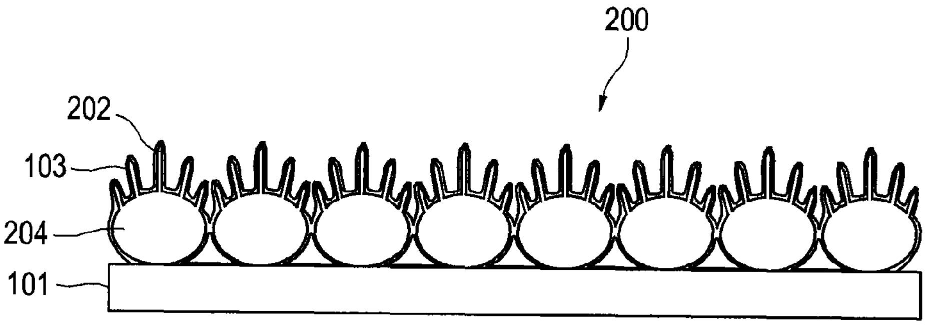
FIG. 2 shows another illustrative embodiment of a hydrophobic composite.

Referring to FIG. 2, another illustrative embodiment of a hydrophobic composite 200 is shown. The hydrophobic composite 200 optionally includes the substrate 101, a plurality of nanostructures 202, the at least one substance 103, and a support 204. The support 204 may be nanoparticles and/or microparticles, from which the plurality of nanostructures 202 are elongated, e.g. as illustrated in FIG. 2. The nanoparticles and/or microparticles may include the same material as described above for the support 104.

The nanoparticles and/or microparticles may have, without limitation, an average diameter of from about 0.01 nm to about 500 μm. In some embodiments, the average diameter of the nanoparticles and/or microparticles may range from about 0.1 nm to about 500 μm, from about 1 nm to about 500 μm, from about 10 nm to about 500 μm, from about 100 nm to about 500 μm, from about 1 μm to about 500 μm, from about 10 μm to about 500 μm, from about 100 μm to about 500 μm, from about 0.01 nm to about 0.1 nm, from about 0.01 nm to about 1 nm, from about 0.01 nm to about 10 nm, from about 0.01 nm to about 100 nm, from about 0.01 nm to about 1 μm, from about 0.01 nm to about 10 μm, from about 0.01 nm to about 100 μm, from about 0.1 nm to about 1 nm, from about 1 nm to about 10 nm, from about 10 nm to about 100 nm, from about 100 nm to about 1 μm, from about 1 μm to about 10 μm, or from about 10 μm to about 100 μm. In other embodiments, the average diameter of the nanoparticles and/or microparticles may be about 0.01 nm, about 0.1 nm, about 1 nm, about 10 nm, about 100 nm, about 1 μm, about 10 μm, about 100 μm, or about 500 μm.

The support 204 in the form of nanoparticles and/or microparticles, along with the plurality of nanostructures 202, forms a geometrically complex surface structure. Accordingly, the hydrophobic composite 200 may exhibit an enhanced overall hydrophobicity.

Figure 3:
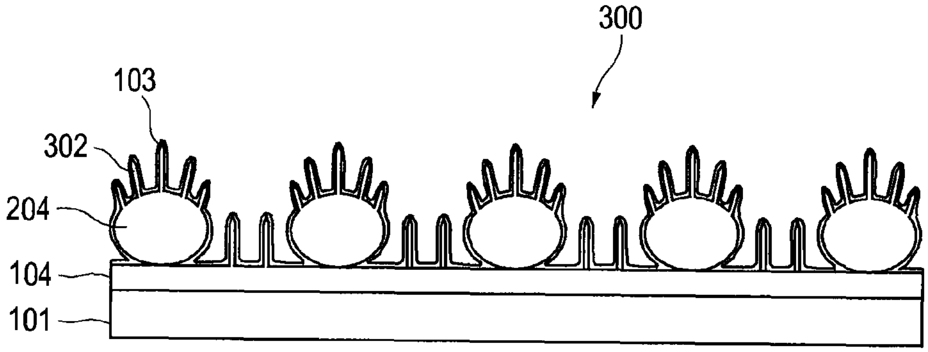
FIG. 3 shows another illustrative embodiment of a hydrophobic composite.

Referring to FIG. 3, another illustrative embodiment of a hydrophobic composite 300 is shown. The hydrophobic composite 300 optionally includes the substrate 101, a plurality of nanostructures 302, the at least one substance 103, and the one or more supports 104, 204. As illustrated in FIG. 3, the plurality of nanostructures 302 are optionally elongated from both of the one or more supports 104, 204, which are in a layer form and a nanoparticle/microparticle form, respectively. The plurality of nanostructures 302 and the one or more supports 104, 204 all together form an additionally complex geometric surface structure. Since the plurality of nanostructures 302 is formed on both the layer-form support 104 and the particle-form support 204, the hydrophobic composite 300 may exhibit a more enhanced hydrophobicity due to the complex geometric structure.

Figure 4A:
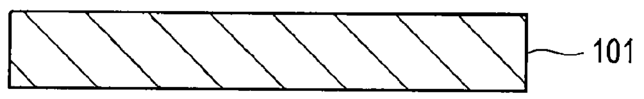
FIGS. 4A-D are schematic diagrams showing an illustrative embodiment of a method of making a hydrophobic composite.
Figure 4B:
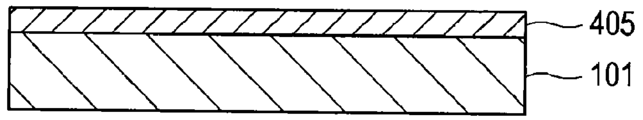

FIGS. 4A-D show an illustrative embodiment of a method of making a hydrophobic composite. Referring to FIG. 4A, the method for making a hydrophobic composite optionally includes providing a substrate 101. Next, as illustrated in FIG. 4B, a metal film 405 may be deposited on the substrate 101. The metal film 405 may include a metal, such as but not limited to copper, titanium, and tungsten. The metal film 405 may have a thickness of, but is not limited to, from about 100 nm to 1 mm. In some embodiments, the thickness of the metal film 405 may range from about 300 nm to about 1 mm, from about 500 nm to about 1 mm, from about 1 μm to about 1 mm, from about 10 μm to about 1 mm, from about 50 μm to about 1 mm, from about 100 μm to about 1 mm, from about 500 μm to about 1 mm, from about 100 nm to about 300 nm, from about 100 nm to about 500 nm, from about 100 nm to about 1 μm, from about 100 nm to about 10 μm, from about 100 nm to about 50 μm, from about 100 nm to about 100 μm, from about 100 nm to about 500 μm, from about 300 nm to 500 nm, from about 500 nm to about 1 μm, from about 1 μm to about 10 μm, from about 10 μm to about 50 μm, from about 50 μm to about 100 μm, or from about 100 μm to about 500 μm. In other embodiments, the thickness of the metal film 405 may be about 100 nm, about 250 nm, about 300 nm, about 500 nm, about 1 μm, about 10 μm, about 50 μm, about 100 μm, about 500 μm, or about 1 mm.

Figure 4C:
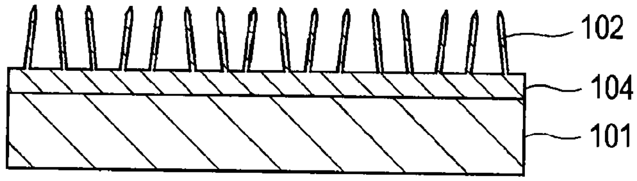
Figure 4D:
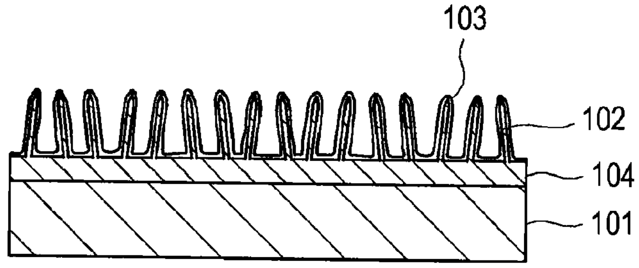

As illustrated in FIG. 4C, the plurality of nanostructures 102 elongated from the support 104 may be formed using the metal film 405 as a seed layer. The plurality of nanostructures 102 may be in a configuration characterized by a first hydrophobicity, e.g., nanowires extending at least partially vertically away from the support 104. In some embodiments, the conditions effective for forming the plurality of nanostructures 102 elongated from the support 104 may be an oxidation treatment of the metal film 405 by an alkaline solution. For example, the metal film 405, e.g., the seed layer, may be immersed in an alkaline solution, where it is oxidized into a metal oxide layer to form the support 104, having the plurality of nanostructures 102 extending therefrom.

The immersing of the metal film 405 in the alkaline solution may be carried out at a temperature of, by way of non-limiting example, from about 50° C. to about 200° C. In some embodiments, the temperature for the alkaline solution treatment may range from about 60° C. to about 200° C., from about 70° C. to about 200° C., from about 90° C. to about 200° C., from about 120° C. to about 200° C., from about 150° C. to about 200° C., from about 180° C. to about 200° C., 50° C. to about 180° C., from about 50° C. to about 150° C., from about 50° C. to about 120° C., from about 50° C. to about 90° C., from about 50° C. to about 70° C., from about 50° C. to about 60° C., from about 60° C. to about 70° C., from about 70° C. to about 90° C., from about 90° C. to about 120° C., from about 120° C. to about 150° C., or from about 150° C. to about 180° C. In other embodiments, the temperature for the alkaline solution treatment may be about 50° C., about 60° C., about 70° C., about 75° C., about 80° C., about 90° C., about 120° C., about 150° C., about 180° C., or about 200° C.

The alkaline solution treatment may be carried out for a sufficient time to obtain the plurality of nanostructures 102, for example, from about 30 seconds to 30 minutes. In some embodiments, the time for the alkaline solution treatment may range from about 1 minute to about 30 minutes, from about 5 minutes to about 30 minutes, from about 10 minutes to about 30 minutes, from about 20 minutes to about 30 minutes, from about 30 seconds to about 20 minutes, from about 30 seconds to about 10 minutes, from about 30 seconds to about 5 minutes, from about 30 seconds to about 1 minute, from about 1 minutes to about 5 minutes, from about 5 minutes to about 10 minutes, or from about 10 minutes to about 20 minutes. In other embodiments, the time for the alkaline solution treatment may be about 30 seconds, about 1 minute, about 5 minutes, about 10 minutes, about 20 minutes, or about 30 minutes.

In some embodiments, after the immersing of the metal film 405 in the alkaline solution, the oxidized metal film, e.g., the support 104, may be heated. The heating may be carried out at a temperature that does not cause a separation between the substrate 101 and the support 104, which can generally be determined by routine experimentation. The heating may be carried out at a temperature of, by way of non-limiting example, from about 360° C. to about 2000° C. In some embodiments, the temperature for the heat treatment may range from about 380° C. to about 2000° C., from about 400° C. to about 2000° C., from about 500° C. to about 2000° C., from about 1000° C. to about 2000° C., from about 1500° C. to about 2000° C., from about 360° C. to about 1500° C., from about 360° C. to about 1000° C., from about 360° C. to about 500° C., from about 360° C. to about 400° C., from about 360° C. to about 380° C., from about 380° C. to about 400° C., from about 400° C. to about 500° C., from about 500° C. to about 100° C., or from about 1000° C. to about 1500° C. In other embodiments, the temperature for the heat treatment may be about 360° C., about 380° C., about 400° C., about 500° C., about 1000° C., about 1500° C., or about 2000° C.

The heat treatment may be carried out, for example, from about 30 seconds to 2 hours. In some embodiments, the time for the heat treatment may range from about 1 minute to about 2 hours, from about 10 minutes to about 2 hours, from about 20 minutes to about 2 hours, from about 30 minutes to about 2 hours, from about 1 hour to about 2 hours, from about 30 seconds to about 1 minute, from about 30 seconds to about 10 minutes, from about 30 seconds to about 20 minutes, from about 30 seconds to about 30 minutes, from about 30 seconds to about 1 hour, from about 1 minute to about 10 minutes, from about 10 minutes to about 20 minutes, from about 20 minutes to about 30 minutes, or from about 30 minutes to about 1 hour. In other embodiments, the time for the heat treatment may be about 30 seconds, about 1 minute, about 3 minutes, about 4 minutes, about 5 minutes, about 10 minutes, about 20 minutes, about 30 minutes, about 1 hour, or about 2 hours.

In accordance with one embodiment by way of non-limiting example, the metal film 405 may be a copper film. The copper film may be prepared by electroplating a substrate, such as glass, plastic, silicon and the like. To form a plurality of nanostructures extending from a support, the copper film is immersed in an alkaline solution. By way of non-limiting example, a mixed solution of sodium chlorite ($NaClO_2$) and sodium hydroxide (NaOH) may be used for the alkaline solution. When immersed in an alkaline solution, a part of or the entire copper film is oxidized into copper oxide, forming a copper oxide layer that behaves as a support, as well as a plurality of copper oxide nanostructures that extend from the copper oxide layer. The alkaline solution may increase the density of the nanostructures per unit area of the copper film support. In some embodiments, after the oxidation treatment of the copper film with an alkaline solution, an additional heat treatment can be carried out for further development of the nanostructure morphology on the support. For example, when heat is applied on the oxidized copper film, additional nanostructures may grow from the copper film or the existing nanostructures may grow longer, in addition to the nanostructures generated by the alkaline solution treatment. In view of the above, the copper film deposited on a substrate may have a thickness of, but is not limited to, from about 250 nm to about 500 μm, which secures a sufficient source for growing the plurality of copper oxide nanostructures.

In other embodiments, the typical operational steps, i.e., immersing a metal film in an alkaline solution and optionally heating the metal film after the immersing to form a plurality of nanostructures elongated from one or more supports, may be carried out in the same manner as that described above for the embodiment illustrated in FIGS. 4B and 4C, with additional requirements, such as modification of the support to include particles, or both layer and particles.

Referring back to FIG. 4D, an at least one substance 103 characterized by a second hydrophobicity may be coated on the plurality of nanostructures 102. The at least one substance 103 may at least partially coat one or more portions of the nanostructures 102.

In some embodiments, the coating of the at least one substance 103 may be carried out by methods including, but not limited to, spray coating, roller coating, dip coating, spin coating, doctor blade coating, screenprinting, thermal evaporation, e-beam evaporation, vacuum evaporation, high-density plasma assist evaporation, ion plating, sputtering, chemical vapor deposition, metal organic chemical vapor deposition, non-vacuum spray deposition, molecular beam epitaxy, and radiofrequency (RF) magnetron sputtering.

In an illustrative embodiment, the above substance 103 may be polysilane or polysiloxane, which may be optionally used with a solvent, a curing agent and a curing catalyst. Any solvent that can dissolve the above hydrophobic substance 103 and be uniformly applied to the plurality of nanostructures 102 may be used without limitation. In some embodiments, a volatile solvent may be used to achieve a quick drying of the coating with at least one substance 103. In other embodiments, alcohol solvents may be used to control curing, as well as drying. In illustrative embodiments, the solvent may include, but is not limited to, benzene, acetone, n-propyl ketone, trichloroethylene, toluene, ethers, cyclohexanone, butryolactone, isopropanol, isobutyl alcohol, and the like. Suitable examples of curing agents may include amines, such as but not limited to, dimethyl methanolamine and dimethyl ethanol amine, organic peroxides, such as but not limited to, diphenyl peroxides and benzoyl peroxide, and silicone elastomer curing agents. Suitable catalysts include, without limitation, organic tin, organic iron, nickel, copper, platinum, ruthenium, or lead compounds.

In other embodiments, the at least one substance 103 may include carbon nanotubes, which may be coated on the plurality of nanostructures 102 by using various techniques, such as but not limited to, dip-coating, spin coating, bar coating, spraying, self-assembly, Langmuir-Blodgett deposition, vacuum filtration, and the like.

Figure 5A:
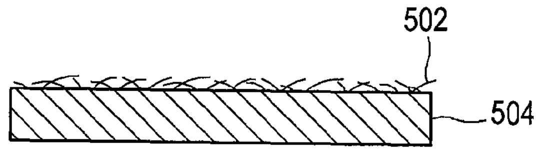
FIGS. 5A-D are schematic diagrams of illustrative embodiments of a plurality of copper oxide nanostructures extending from a support.
Figure 5B:
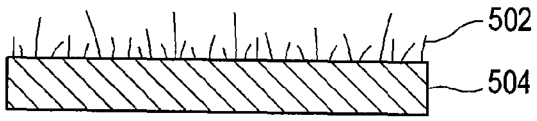
Figure 5C:
Figure 5D:
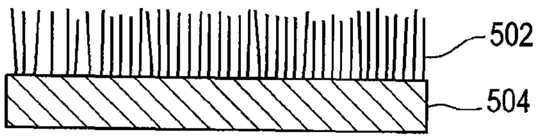

FIGS. 5A-D are schematic diagrams of illustrative embodiments of roughened surfaces having e.g. a plurality of copper oxide nanostructures. As illustrated in FIG. 5A, a plurality of grassplot-like nanostructures 502 is grown when a copper film is used as a seed layer and is treated with an alkaline solution for 5 min at 75° C. FIG. 5B shows wire-shaped copper oxide nanostructures 502 extending from the oxidized copper film 504 after a heating step at 400° C. for 3 min. FIGS. 5C and 5D show the wire-shaped copper oxide nanostructures 502 extending from the oxidized copper film 504 after an additional heating step at 500° C. for 4 min and 20 min, respectively.

Compared to the nanostructures 502 shown in FIG. 5A, the nanostructures 502 formed on the surface of the oxidized copper film 504 after the additional heat treatment, as illustrated in FIGS. 5B-D, are denser and longer. The copper oxide nanostructures 502 are distributed uniformly on the copper oxide layer 504, as shown in FIGS. 5A-D. Typically, the copper oxide nanostructures 502 include mainly cupric oxide (CuO) but may also include cuprous oxide ($Cu_2O$).

The heating temperature may affect the morphologies of the copper oxide nanostructures 502. As the heating temperature goes up, the average growth rate of the nanostructures 502 increases, resulting in an increased length and diameter of the nanostructures. For example, when the heating temperature is 400° C., the copper oxide nanostructures 502 grow with an average growth rate of about 0.3 μm/min with a maximum length of about 4 μm and an average diameter of about 20 nm, as illustrated in FIG. 5B. When the heating temperature is 500° C., the copper oxide nanostructures 502 grow with an average growth rate of about 1.5 μm/min with a maximum length of about 6 μm and an average diameter of 100 nm, as illustrated in FIGS. 5C-D. Further, FIGS. 5C and 5D show that the length of the copper oxide nanostructures 502 may become uniform, as the heating time increases. Thus, the desired diameter, length, and the uniformity of the metal oxide nanostructures could be controlled by adjusting conditions, such as oxidization time and temperature and heating time and temperature.

The plurality of the nanostructures as described herein may be configured to extend from the support in various angles and directions. In some embodiments, each of the nanostructures may extend from the support in many different directions with a similar tilt angle to the support surface. In other embodiments, each of the nanostructures may extend from the support in many different directions with a variety of tilt angles ranging, without limitation, from no less than about 0° to about 90°, from about 15° to about 90°, from about 30° to about 90°, from about 45° to about 90°, from about 60° to about 90°, from about 75° to about 90°, from no less than about 0° to about 15°, from no less than about 0° to about 30°, from no less than about 0° to about 45°, from no less than about 0° to about 60°, from no less than about 0° to about 75°, from about 15° to about 30°, from about 30° to about 45°, from about 45° to about 60°, or from about 60° to about 75° to the support surface.

In certain embodiments, most of the nanostructures may extend from the support in a similar direction with a variety of different angles to the support surface. For example, most of the nanostructures may extend from the support in a direction generally perpendicular to the support surface while some nanostructures are at various angles with the support surface. In other embodiments, almost all of the nanostructures may extend from the support in the same direction with a similar tilt angle to the support surface, e.g., perpendicular to the support surface.

The directional arrangement of nanostructures on a composite surface can greatly influence hydrodynamics and make a super-repellent surface. Further, longer nanostructures may result in a larger volume of air being trapped in the surface, thereby increasing the overall hydrophobicity of the composite. The above illustrated hydrophobic composites may have surfaces with reduced wettability and self-cleaning properties.

EXAMPLES

The following examples are provided for illustration of some of the illustrative embodiments of the present disclosure but are by no means intended to limit their scope.

Example 1

Preparation of a Hydrophobic Composite

A plurality of nanostructures elongated from a support is prepared by the following process. A copper film with a 300 nm thickness is prepared by depositing a copper electroplating solution on a glass substrate with a counter electrode of silver. The copper electroplating solution is prepared by mixing 75 g/L of $CuSO_4.5H_2O$, 180 g/L of $H_2SO_4$, and 70 mg of HCl.

An alkaline solution is prepared by dissolving 37.5 g sodium chlorite($NaClO_2$), 50 g sodium hydroxide(NaOH), and 100 g sodium orthophosphate hydrate($Na_3PO_4.12H_2O$) in 100 L of deionized water. The copper film is immersed into the alkaline solution for 5 min at 80° C.

After the oxidation treatment with the alkaline solution, the oxidized copper film is rinsed with deionized water and dried. The oxidized copper film is then heated at 500° C. for 5 min. A hot plate is used as a heating source, and a constant temperature condition is maintained during the heating process. In this way, a number of nanowires grow outward from the oxidized copper film.

The prepared surface having a plurality of nanostructures is coated with vinyl terminated polydimethylsiloxane (containing 1 wt % Sylgard 184 curing agent) by spin-coating at a speed of 3000 rpm for 30 sec, then cured in an oven at about 120° C. for 2 hr. The surface morphology and the extent of chemical coating of the hydrophobic composite surface is observed using a scanning electron microscope (SEM), X-ray diffraction (XRD), X-ray photoelectron spectroscopy (XPS), and the like. As a result, a hydrophobic composite having a water-repellent coating over a plurality of nanowires is prepared.

For water contact angle measurements, the sessile drop method is used with a contact angle meter (DropMaster 500: Kyowa Scientific Company, Ltd.; Japan) at an ambient temperature. The water contact angle value of the prepared hydrophobic composite is about 164°.

Example 2

Preparation of a Hydrophobic Composite

A plurality of nanostructures extending from two different type of supports is prepared by the following process.

A copper film of a 300 nm thickness is prepared by depositing a copper electroplating solution on a glass substrate with a counter electrode of silver. The copper electroplating solution is prepared by mixing 75 g/L of $CuSO_4.5H_2O$, 180 g/L of $H_2SO_4$, and 70 mg of HCl. Then, copper particles are deposited on the copper film by spray coating (at a pressure of 4 kg/cm$^2$) with a copper solution prepared by mixing copper particles (0.1 mg/mL) into deionized water at 100° C.

An alkaline solution is prepared by dissolving 37.5 g sodium chlorite($NaClO_2$), 50 g sodium hydroxide(NaOH), and 100 g sodium orthophosphate hydrate($Na_3PO_4.12H_2O$) in 100 L of deionized water. The copper film having the deposited copper particles is immersed into the alkaline solution for 5 min at 80° C. to grow a number of nanowires extending outward from the oxidized copper film and copper particles.

The prepared surface having a plurality of nanostructures is coated with vinyl terminated polydimethylsiloxane (containing 1 wt % Sylgard 184 curing agent) by spin-coating at a speed of 3000 rpm for 30 sec, then cured in an oven at about 120° C. for 2 hr. As a result, a hydrophobic composite having a water-repellent coating over a plurality of nanowires and nanoparticles is prepared. The water contact angle value of the prepared hydrophobic composite is about 172°.

EQUIVALENTS

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular embodiments only, and is not intended to be limiting.

Those skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application.

The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A hydrophobic composite comprising:

a plurality of microstructures elongated from one or more supports and having a configuration characterized by a first hydrophobicity; and at least one substance characterized by a second hydrophobicity and configured to at least partially cover one or more portions of the plurality of nanostructures such that an overall hydrophobicity of the hydrophobic composite is greater than the first hydrophobicity, wherein the nanostructures are nanowires having an average length of about 1 μm to about 6 μm, and wherein the one or more supports comprises a metal oxide selected from the group consisting of a tungsten oxide and a copper oxide, and wherein when the metal oxide of the support is tungsten oxide, the nanowires are tungsten oxide, and when the metal oxide of the support is copper oxide, the nanowires are copper oxide, and wherein the nanostructures are configured such that a first end is adjacent to and covering a portion of the one or more supports and a second end is distal to the one or more supports, and wherein the substance comprises carbon nanotubes.

2. The composite of claim 1, wherein the overall hydrophobicity is greater than each of the first and second hydrophobicities.

3. The composite of claim 1, wherein the nanowires have an average length of about 1 μm to about 4 μm.

4. The composite of claim 1, wherein the at least one substance is configured to cover from about 10% to about 100% of the one or more supports, that are not covered by the nanostructures.

5. The composite of claim 1, wherein the at least one substance is configured to cover from about 10% to about 100% of the first end of the nanostructures.

6. The composite claim 1, wherein the at least one substance is configured to cover from about 10% to about 100% of the second end of the nanostructures.

7. The composite of claim 1, wherein the metal oxide is a copper oxide selected from the group consisting of: cuprous oxide, cupric oxide, and a combination thereof.

8. A hydrophobic composite comprising:

a plurality of microstructures provided in a configuration in which each of the nanostructures is configured to extend at least partially vertically away from one or more supports in such a way that the nanostructures are characterized by a first hydrophobicity; and at least one substance characterized by a second hydrophobicity and configured to at least partially cover one or more portions of the plurality of nanostructures, whereby the composite is characterized by an overall hydrophobicity, at least a portion of which is attributed to the configuration of the nanostructures, at least a portion of which is attributed to the configuration of the substance and, therefore, which is greater than the first hydrophobicity, wherein the nanostructures are nanowires having an average length of about 1 μm to about 6 μm, and wherein the one or more supports comprises a metal oxide selected from the group consisting of a tungsten oxide and a copper oxide, and wherein when the metal oxide of the support is tungsten oxide, the nanowires are tungsten oxide, and when the metal oxide of the support is copper oxide, the nanowires are copper oxide, and wherein the nanostructures are configured such that a first end is adjacent to and covering a portion of the one or more supports and a second end is distal to the one or more supports, and wherein the substance comprises carbon nanotubes.

9. The composite of claim 8, wherein the nanowires have an average length of about 1 μm to about 4 μm.

10. The composite of claim 8, wherein the at least one substance is configured to cover from about 10% to about 100% of the one or more supports, wherein said portions of the one or more supports are not covered by the nanostructures.

11. The composite of claim 8, wherein the at least one substance is configured to cover from about 10% to about 100% of the first end of the nanostructures.

12. The composite of claim 8, wherein the at least one substance is configured to cover from about 10% to about 100% of the second end of the nanostructures.

13. The composite of claim 8, wherein the metal oxide is a copper oxide selected from the group consisting of: cuprous oxide, cupric oxide, and a combination thereof.

* * * * *

UNITED STATES PATENT AND TRADEMARK OFFICE

CERTIFICATE OF CORRECTION

PATENT NO. : 8,734,929 B2
APPLICATION NO. : 12/197754
DATED : May 27, 2014
INVENTOR(S) : Kim et al.

It is certified that error appears in the above-identified patent and that said Letters Patent is hereby corrected as shown below:

On the Title Page, in item (73), under “Assignee”, in Column 1, Line 1, delete “Foundation (KR)” and insert -- Foundation, Seoul (KR) --, therefor.

Signed and Sealed this
Twenty-fourth Day of March, 2015

Michelle K. Lee
*Director of the United States Patent and Trademark Office*